Patented Sept. 23, 1952

2,611,774

UNITED STATES PATENT OFFICE 2,611,774

DIPHENYLSILOXANE COPOLYMERS AND METHODS OF PREPARATION THEREOF

Leslie J. Tyler, Midland County, Mich., assignor to Dow Corning Corporation, Midland, Mich., a corporation of Michigan No Drawing. Application January 9, 1950, Serial No. 137,670

2 Claims. (Cl. 260—448.2)

This invention relates to new compositions of matter and to improved methods of preparing polymeric organopolysiloxanes.

The present industrial production of organosilicon products is based upon the employment of organosilanes which contain hydrolyzable groups such as chlorine atoms or ethoxy radicals. Such silanes are hydrolyzed and the resulting hydrolysates are condensed to give the corresponding organosiloxanes. Likewise the cohydrolysis and cocondensation of mixtures of silanes is employed to produce copolymers with specific desirable properties.

This general method has been found highly inefficient, however, for the incorporation of diphenyl substituted silicon into distillable copolymeric siloxanes. The inefficiency of this method lies in two major short-comings: First, if a cohydrolysis of diphenyldichlorosilane with another organohalosilane is attempted, diphenylsilanediol is formed. Extensive intercondensation of the mixture of silanols is not obtained, because of the stability of the diphenylsilanediol and because of its tendency to remain in a phase separate from the remainder of the reaction product. The diphenylsilanediol is at best merely an expensive by-product. Second, when the desired product is a single molecular species, cohydrolysis and co-condensation of a mixture of silanes is a prohibitively uneconomic means of obtaining it. This is because of the wide range of compounds formed in the cohydrolysis-cocondensation type of process, with the resulting low yield of the particular molecular species desired.

It is an object of this invention to provide improved methods for the preparation of siloxane copolymers; for the incorporation of diphenyl substituted silicon atoms into distillable polysiloxane copolymers; and for the preparation of single molecular species of polysiloxanes in improved yields.

Other objects and advantages will be apparent from the following description.

In accordance with a preferred form of the present invention a silane diol or siloxane diol in which each silicon atom is bonded to two phenyl radicals is reacted with an alkoxy silane. The reaction is not dependent upon temperature. It is brought about by contacting the reactants in liquid phase. Reduction of the operating temperature has the effect of reducing the rate of reaction as is common with many processes. Preferably, however, the reaction is conducted at a temperature such that vaporization of the alcohol produced will be obtained at the pressure employed.

The alkoxy silanes employed in the process of this invention are compounds of the general formula $R(CH_3)_2SiOR'$, in which R represents a radical of the group consisting of methyl and phenyl radicals and R' represents an alkyl radical of less than 5 carbon atoms.

The silane diols or siloxane diols employed in the process of this invention are compounds of the general formula $HO[(C_6H_5)_2SiO]_xH$, in which $x$ is an integer of from 1 to 3 inclusive. The preparation of diphenyl substituted siloxane diols is described by F. S. Kipping in Jour. Chem. Soc. (London) 101, 2125–42 (1912). Diphenylsilanediol is well known to the art.

The reaction of this invention may be carried out at atmospheric, subatmospheric, or superatmospheric pressures. The temperature employed is not critical. It is preferably below 250° C., and at least the boiling point of the by-produced alcohol at the pressure employed. The alcohol formed in the reaction may also be removed by vaporization at below its boiling point by such well known methods as blowing a stream of air through the reaction mixture. The reaction proceeds satisfactorily in the absence of a catalyst, but acidic catalysts such as $H_2SO_4$ and HCl, or alkaline catalysts such as NaOH and KOH, may be employed if desired.

The proportions of the reactants may be varied in accordance with the type of product desired, but since the reaction is to a large extent metathetical, it is uneconomic to exceed the ratio of ten mols of either reactant to one mol of the other.

The products of this invention are the alcohol corresponding to the alkoxy silane used, and the siloxane copolymer. The copolymer is represented by the general formula $$R(CH_3)_2SiO[(C_6H_5)_2SiO]_xSi(CH_3)_2R$$

in which R is selected from the group consisting of phenyl and methyl radicals and $x$ is an integer of from 1 to 3 inclusive.

The reaction may be represented by the following equation, in which methyl and phenyl radicals are represented by Me and Ph respectively.

$$2RMe_2SiOR' + HO(Ph_2SiO)_xH \rightarrow 2R'OH + RMe_2SiO(Ph_2SiO)_xSiMe_2R$$

Certain amounts of the dimer, $RMe_2SiOSiMe_2R$, and copolymers of the general formula $RMe_2SiO(Ph_2SiO)_ySiMe_2R$, in which $y$ has a value greater than 3, are also formed as products of this process.

The products of my invention are useful as diffusion pump fluids and as special lubricants for glass, rubber, and plastics.

The following examples describe specific embodiments of the invention, but are not to be construed as limiting the scope thereof. All parts given are by weight.

Example 1

A mixture of 108 parts of diphenylsilanediol and 118 parts of trimethylethoxysilane was heated to reflux temperature for 16 hours, then an additional 20 parts of trimethylethoxysilane were added. Ethanol and unreacted trimethylethoxysilane were removed by distillation. The liquid residue was distilled further at reduced pressure, yielding 102 parts of 3,3-diphenyl-hexamethyltrisiloxane, $(CH_3)_3SiO[(C_6H_5)_2SiO]Si(CH_3)_3$ which has the following properties: B. P. 110° C./0.27 mm., $N_D^{20}$ 1.4981, $d_4^{20}$ 0.984, molar refraction 107.7.

Example 2

A mixture of 90 parts of dimethylphenylethoxysilane and 54 parts of diphenylsilanediol was heated at 135–145° C for 16 hours. Fractionation of the reaction products yielded ethanol; unreacted dimethylphenylethoxysilane; 1,1,5,5-tetramethyltetraphenyltrisiloxane, $C_6H_5(CH_3)_2SiO[(C_6H_5)_2SiO]Si(CH_3)_2C_6H_5$ and a residue of dimethylphenyl end-blocked diphenylpolysiloxanes. The 1,1,5,5-tetramethyltetraphenyltrisiloxane has a boiling point of about 183° C. at 0.2 mm. pressure, a viscosity of 32 cs. at 25° C., and a refractive index of 1.5543 at 25° C.

Example 3

A mixture of 3.6 moles of dimethylphenylethoxysilane and 1.8 moles of diphenylsilanediol was heated at 82–85° C. for 16 hours. Fractionation of the reaction products gave 1,1,5,5-tetramethyltetraphenyltrisiloxane amounting to 44 per cent of theoretical.

Example 4

A mixture of 2.0 moles of trimethylethoxysilane and 1.0 mole of $HO[(C_6H_5)_2SiO]_2H$ was heated to about 100° C. for 16 hours. Fractionation of the reaction products yielded ethanol, unreacted trimethylethoxysilane, and $(CH_3)_3SiO[(C_6H_5)_2SiO]_2Si(CH_3)_3$ That which is claimed is:

1. Compounds of the general formula $C_6H_5(CH_3)_2SiO[(C_6H_5)_2SiO]_xSi(CH_3)_2C_6H_5$ in which $x$ is an integer of from 1 to 3 inclusive.

2. A composition of matter having the formula:

$C_6H_5(CH_3)_2SiO(C_6H_5)_2SiOSi(CH_3)_2C_6H_5$

LESLIE J. TYLER.

REFERENCES CITED

The following references are of record in the file of this patent:

UNITED STATES PATENTS

| Number | Name | Date |
| --- | --- | --- |
| 2,449,940 | Hyde | Sept. 21, 1948 |
| 2,469,888 | Patnode | May 10, 1949 |

FOREIGN PATENTS

| Number | Country | Date |
| --- | --- | --- |
| 938,272 | France | Sept. 9, 1948 |